(12) United States Patent
Reid et al.

(10) Patent No.: US 9,934,233 B2
(45) Date of Patent: Apr. 3, 2018

(54) SEARCHABLE DATA ARCHIVE

(71) Applicant: BAE SYSTEMS plc, London (GB)

(72) Inventors: Iain Norman Nicol Reid, Guilford Surrey (GB); Richard Thomas Jarvis, Guilford Surrey (GB); Dafydd Huw Lewis Winfield, Guilford Surrey (GB); Peter Stuart Gardiner, Guilford Surrey (GB)

(73) Assignee: BAE SYSTEMS plc, London (GB)

( * ) Notice: Subject to any disclaimer, the term of this patent is extended or adjusted under 35 U.S.C. 154(b) by 310 days.

(21) Appl. No.: 14/653,628

(22) PCT Filed: Dec. 16, 2013

(86) PCT No.: PCT/GB2013/053308
§ 371 (c)(1),
(2) Date: Jun. 18, 2015

(87) PCT Pub. No.: WO2014/096796
PCT Pub. Date: Jun. 26, 2014

(65) Prior Publication Data
US 2015/0347443 A1 Dec. 3, 2015

(30) Foreign Application Priority Data

Dec. 20, 2012 (GB) .................................. 1223060.3
Feb. 13, 2013 (EP) .................................. 13275027

(51) Int. Cl.
*G06F 17/30* (2006.01)
(52) U.S. Cl.
CPC .. *G06F 17/30153* (2013.01); *G06F 17/30073* (2013.01); *G06F 17/30312* (2013.01);
(Continued)

(58) Field of Classification Search
CPC combination set(s) only.
See application file for complete search history.

(56) References Cited

U.S. PATENT DOCUMENTS 6,049,804 A 4/2000 Burgess et al.
7,447,801 B2 * 11/2008 Mitra ................ G06F 17/30067
707/E17.01
(Continued)

FOREIGN PATENT DOCUMENTS

EP 2538355 A1 12/2012
WO 2014096796 A1 6/2014

OTHER PUBLICATIONS

International Preliminary Report on Patentability and Written Opinion received for Patent Application No. PCT/GB2013/053308, dated Jul. 2, 2015. 7 pages.
(Continued)

*Primary Examiner* — Etienne Leroux
(74) *Attorney, Agent, or Firm* — Finch & Maloney PLLC

(57) ABSTRACT

A method and apparatus are provided to store transaction records in a retrievable form and to enable subsequent search and retrieval of stored transaction records. Transaction records are captured and then grouped according to predetermined grouping criteria such that they may be indexed to a first level and then efficiently compressed for bulk storage. In the event that records need to be retrieved subsequently, the first level index may be used to select one or more groups of records satisfying first level search criteria and, following retrieval of the selected groups from storage and de-compression, a second level index may be created to enable a more detailed record-level search for matching records in the retrieved groups. Preferably, the same indexing technique is used for both the first and second level of indexing.

20 Claims, 4 Drawing Sheets

(52) U.S. Cl.
CPC .. *G06F 17/30321* (2013.01); *G06F 17/30598* (2013.01); *G06F 17/30946* (2013.01)

(56) References Cited

U.S. PATENT DOCUMENTS

| | | | |
|---|---|---|---|
| 2006/0259652 A1* | 11/2006 | Poo | G06F 3/0607 710/8 |
| 2008/0104149 A1 | 5/2008 | Vishniac et al. | |
| 2012/0005224 A1* | 1/2012 | Ahrens | G06Q 10/10 707/769 |
| 2012/0023073 A1 | 1/2012 | Dean et al. | |
| 2013/0013606 A1* | 1/2013 | Stanfill | G06F 17/30297 707/737 |

OTHER PUBLICATIONS

International Search Report and Written Opinion received for Patent Application No. PCT/GB2013/053308, dated Jan. 21, 2014. 10 pages.

Extended European Search Report received for EP Patent Application No. 13275027.4, dated Jul. 16, 2013. 8 pages.

\* cited by examiner

SEARCHABLE DATA ARCHIVE

This invention relates to the storage of transaction records and in particular, but not exclusively, to techniques for efficient storage and subsequent retrieval of time-based transaction records in a data archive, for example for long term storage of mobile or fixed line telecommunications network call records.

Recent legislation has increased the onus on telecommunications operators, in particular, to retain call records in a form that can be searched and retrieved, on demand, at any time during a period of up to two years from the date on which the call records are generated, for example in support of a police investigation. Given the very large number of calls made over fixed and mobile telecommunications networks every day, the large data storage requirements for the resultant call records involves a significant financial investment by the respective operators, particularly in view of the need for any selected method of storage to be able to support subsequent demands for retrieval. Such demands, often with very little notice and requiring a very rapid response, may require an ability to search and retrieve all transaction records matching search criteria based upon any combination of stored parameters.

From a first aspect, the present invention resides in a method for generating a searchable archive for transaction records, wherein each transaction record comprises values for each of a plurality of parameters at least one of which relates to time, the method comprising the steps of:
(i) receiving a plurality of transaction records;
(ii) collating the received transaction records into a plurality of groups of transaction records according to predetermined grouping criteria;
(iii) generating one or more first level indexes to the plurality of groups of transaction records, wherein each of the one or more first level indexes is based upon at least one data type associated with the transaction records;
(iv) applying a selected compression algorithm to compress each of the plurality of groups collated at step (ii); and
(v) storing the compressed groups of transaction records,
  wherein said predetermined grouping criteria are defined according to the selected compression algorithm and to the content of the received transaction records thereby to achieve a predetermined level of compression performance at step (iv).

Preferred embodiments of the present invention are able both to reduce the volume of data storage required to capture an often vast number of transaction records and yet to store them in such a way that they may be retrieved and searched rapidly, to whatever level of detail may be required, in a subsequent investigation.

Preferably, at step (ii), the predetermined grouping criteria define a minimum number of transaction records or a minimum volume of data to be contained within a group of transaction records being collated for compression. Alternatively, the predetermined grouping criteria define a measure of diversity in the content of data to be achieved when collating a group of transaction records for compression. However, while such criteria may assist in increasing the compression performance of a chosen compression algorithm, further alternative grouping criteria may define a range of values for one or more data types relating to records in a group of transaction records being collated for compression.

In a high data rate as well as a high data volume application, at step (ii), the predetermined grouping criteria may further comprise criteria for allocating one or more collated groups of transaction records to one of a plurality of shards of processing and storage and wherein, at step (iii), each of the one or more first level indexes is generated by, and in respect of records allocated to, a different one of said plurality of shards.

In a preferred embodiment, the predetermined level of compression performance comprises at least a 50% reduction in data storage required for a compressed group of transaction records in comparison with that required for a respective uncompressed group. In a further preferred embodiment, the predetermined level of compression performance comprises at least a 70% reduction in data storage required for a compressed group of transaction records in comparison with that required for a respective uncompressed group. In a yet further preferred embodiment, the predetermined level of compression performance comprises at least a 90% reduction in data storage required for a compressed group of transaction records in comparison with that required for a respective uncompressed group.

Among preferred applications of the present invention, the transaction records may comprise telecommunications call records or financial transaction records.

From a second aspect, the present invention resides in a method for retrieving compressed transaction records stored according to the method of the first aspect, comprising the steps of:
(vi) receiving search criteria for the retrieval of stored records, the search criteria defining a value or a value range for one or more data types represented in the stored records;
(vii) using a first level index generated in respect of the stored records to select one or more compressed groups of records of relevance to the received search criteria;
(viii) decompressing the selected one or more groups of records;
(ix) identifying one or more of the decompressed records whose content matches the received search criteria.

Preferably, step (ix) comprises generating one or more second level indexes to the information contained within the decompressed transaction records and using the one or more second level indexes to identify and retrieve one or more individual transaction records matching the received search criteria. Conveniently, the same indexing functionality is used to create indexes at both the first and the second levels.

In a preferred embodiment, to increase the rate at which stored data may be retrieved and searched, step (ix) further comprises persistently storing the one or more second level indexes.

From a third aspect, the present invention resides in a computer program product comprising a data carrier having stored thereon, or comprising means for accessing and enabling the execution of, computer program code means which when loaded into and executed by a computer cause the computer to implement the method according to the first or second aspect of the present invention.

Preferred embodiments of the present invention will now be described in more detail, by way of example only, with reference to the accompanying drawings of which:

Figure 1:
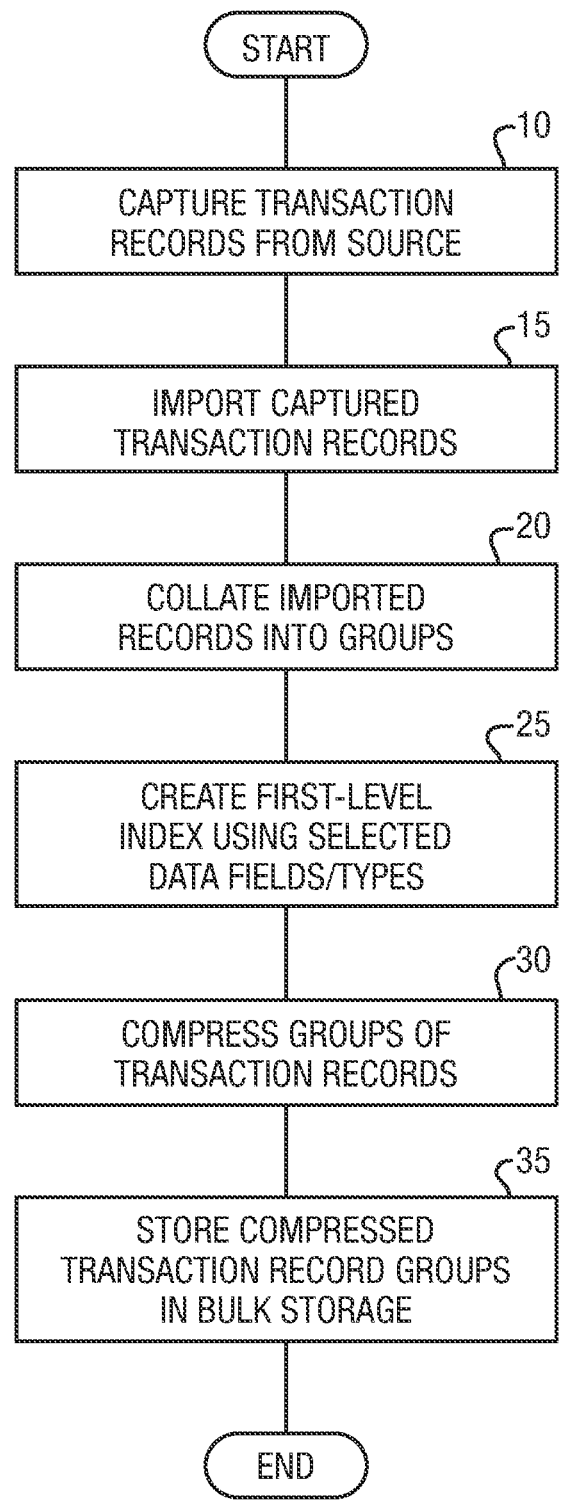
FIG. 1 is a flow diagram showing, in outline, steps in a transaction data storage method according to a preferred embodiment of the present invention.
Figure 2:
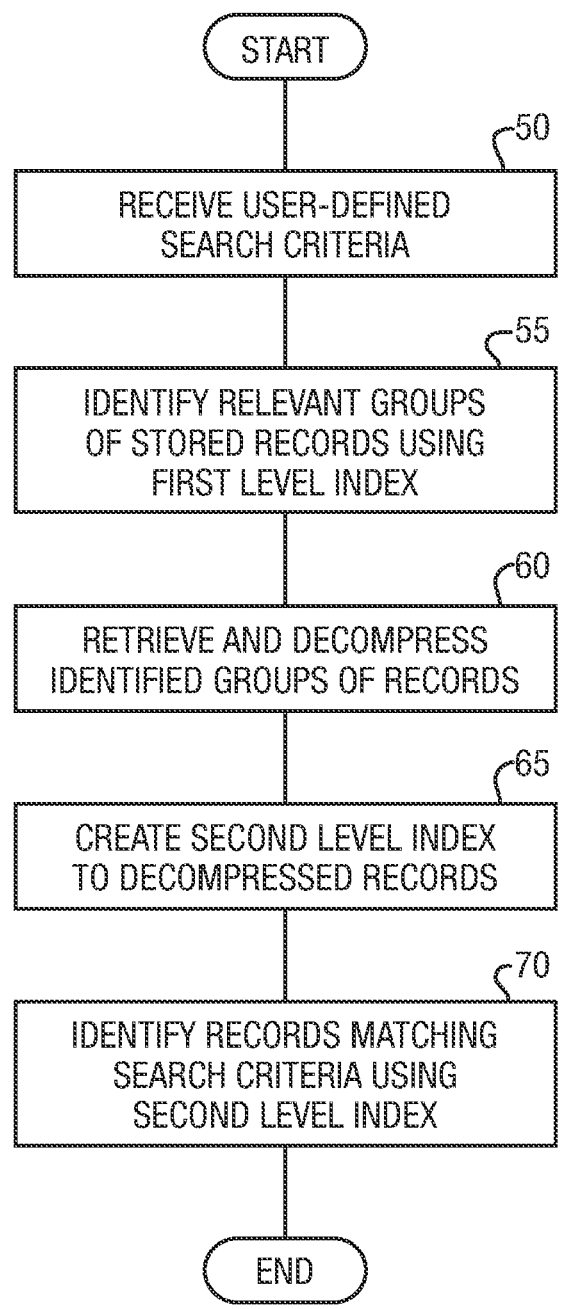
FIG. 2 is a flow diagram showing, in outline, steps in a preferred search and retrieval method for accessing transaction data stored according to the method in FIG. 1.
Figure 3:
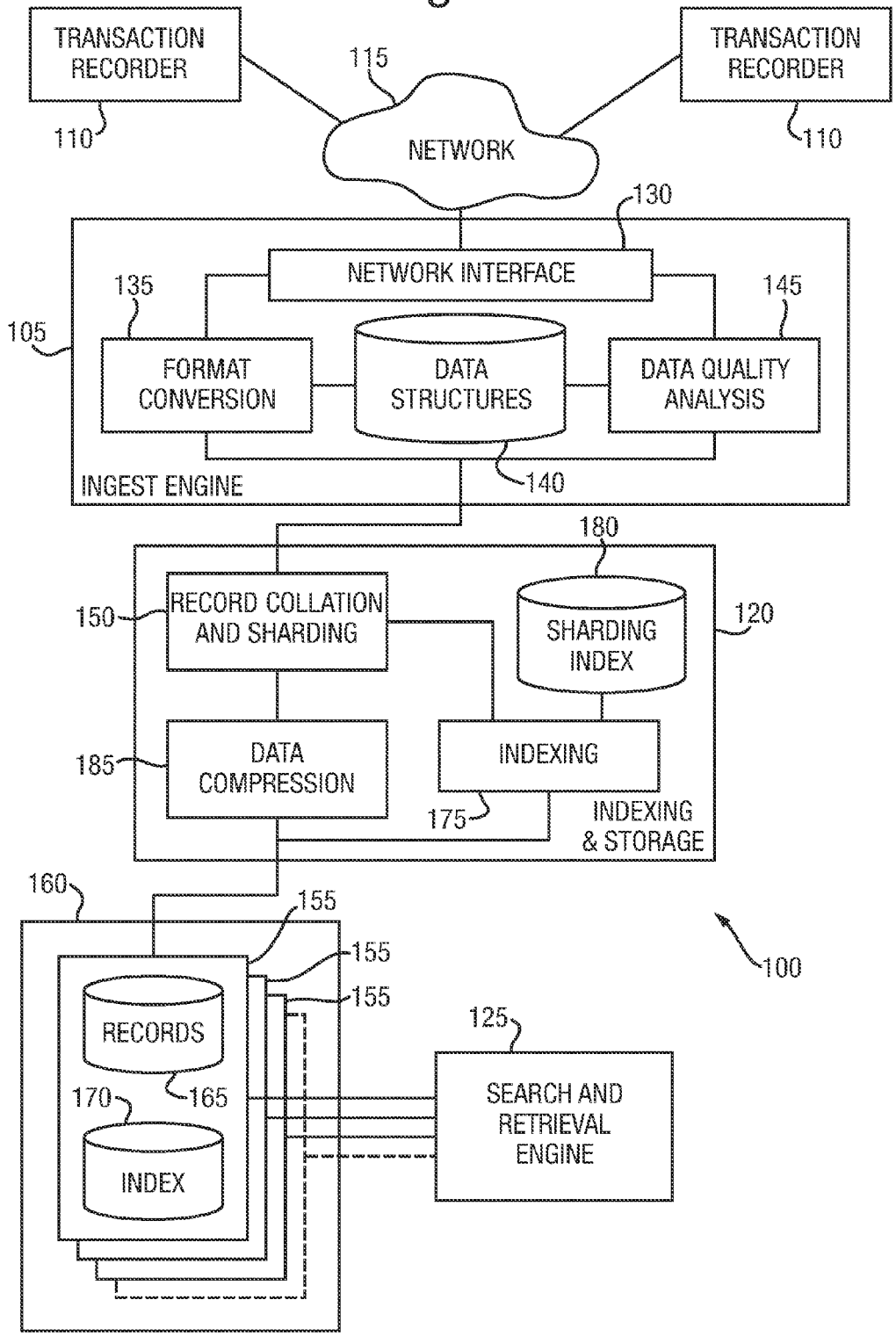
Figure 4:
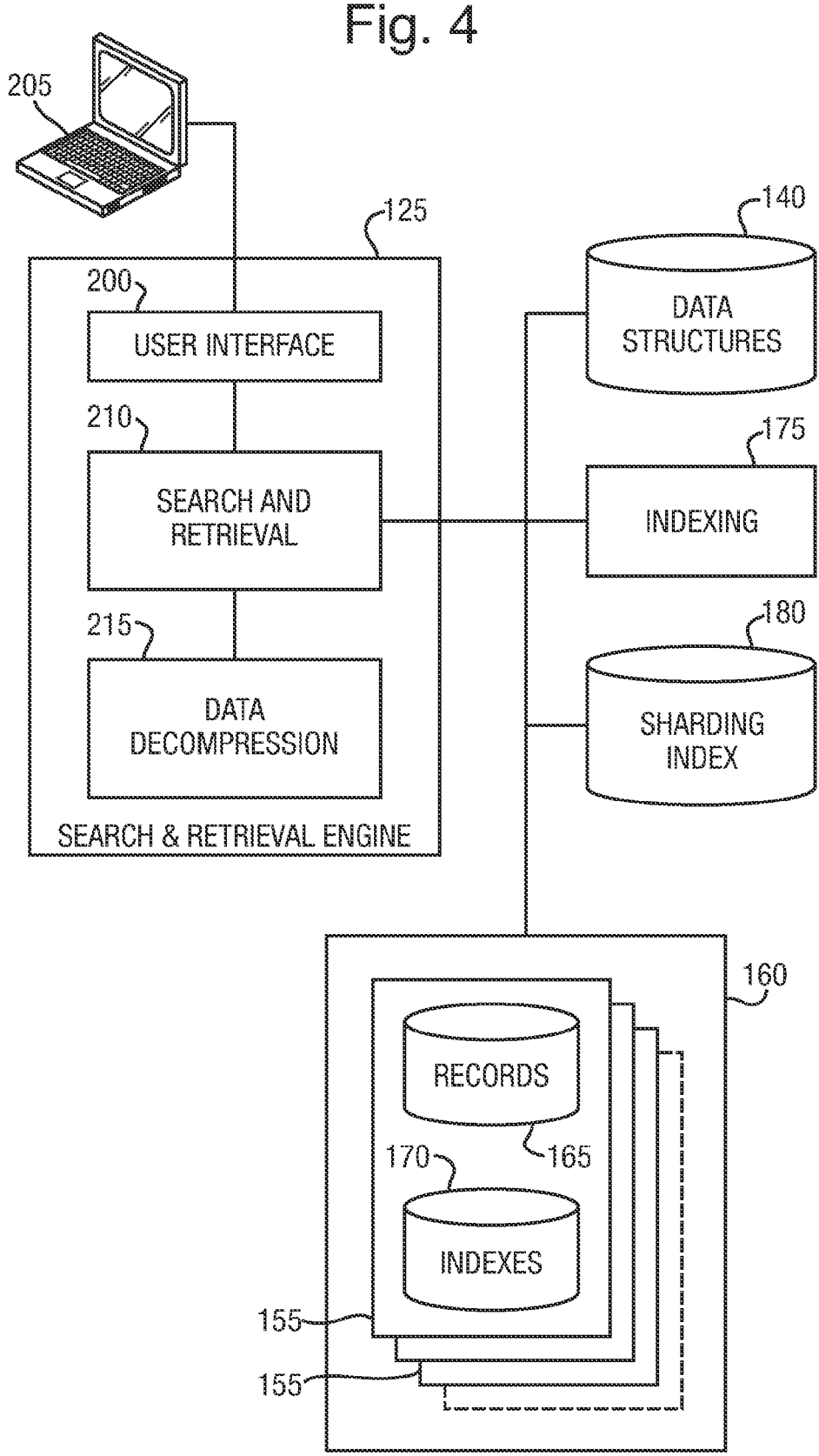

FIG. 3 is a diagram showing key functional modules in a preferred apparatus for implementing the data storage method outlined in FIG. 1, according to a preferred embodiment of the present invention; and FIG. 4 is a diagram showing key functional modules in a preferred apparatus for implementing the search and retrieval method outlined in FIG. 2, according to a preferred embodiment of the present invention.

The present invention is directed to the capture, storage and, as required, subsequent retrieval of transaction data. Transaction data are generated typically in the form of transaction records recording details of a particular type of event each time such an event takes place. Data captured in a transaction record will typically include a record of the date and time of the event together with one or more parameters sufficient to define the event. The specific data recorded will usually be determined by the objectives for the capture of transaction data. For example, such data may form the basis of a billing process for transaction-based charging for services, e.g. telecommunications services where payment is required from users in respect of the calls they initiate. In other systems, the data captured may provide usage statistics for planning and capacity management purposes.

The present invention may be applied to the capture and storage of any form of transaction data. Typical sources include, besides telecommunications operators: financial institutions recording financial transactions; public transport companies in which payment for travel is triggered by a so-called "swipe-card"; and any type of secure access facility in which swipe-card controlled door locks are used and transaction records are generated capturing the times of entry and the swipe card data identifying the individuals gaining access.

Transaction data may serve purposes beyond their original need. For example a parameter-based search and retrieval facility may be provided to enable transaction records relating to particular parameter values or ranges to be identified and retrieved. However, such a requirement needs to be balanced with the practical issues of data storage and accessibility, particularly if such purposes require records to be retained for any appreciable time period after generation. This is the case with telecommunications call records which can provide useful information to the Police on the whereabouts of particular individuals subject to criminal investigations. Legislation is now in place in the UK to impose a minimum period for retention of telecommunications call records. Given that approximately 700 million call records are generated per day in the UK, as of 2011, the volume of data that must be captured and stored in a quickly searchable and retrievable form is very significant and imposes additional overhead costs on telecommunications operators to preserve such data in a highly retrievable form. The present invention is directed to alleviating the problems associated with the capture and retrieval of transaction records being generated in such volumes.

Preferred embodiments of the present invention implement a data capture and retrieval process, operating typically as two sub-processes separated in time: a first sub-process relating to the on-going capture and storage of transaction records as a bulk data handling process; a second sub-process relating to the subsequent and intermittent search and retrieval of specific transaction records from the stored data. By way of a summary, an outline description will now be provided of the first and second sub-processes, the first with reference to FIG. 1 and the second with reference to FIG. 2.

Referring firstly to FIG. 1, a flow chart summarises key steps in a preferred data capture and storage sub-process, typically operating continuously and as a number of parallel processes, beginning at STEP 10 with the capture of transaction records, typically by continuous streaming over a network or by another method of transfer from a source of transaction records. At STEP 15, the captured transaction records are imported into a predetermined data format, if different from the format of the captured records, this step including any necessary identification of key data types within a field structure of the captured transaction records and a check on data quality. At STEP 20 the imported records are collated into groups based upon predetermined grouping criteria as will be discussed below. At STEP 25, a first level index is created, or updated, based upon one or more of the data fields identified at STEP 15, and the index is persistently stored. The choice of indexed data type or types is intended to enable subsequent selection of at least one of the groups of collated records, from STEP 20, relating to a specific time period or to a specific range of values of an indexed data type. At STEP 30, each of the collated groups of records are compressed using a predetermined data compression algorithm and at STEP 35 the compressed groups of transaction records are stored in a retrievable form.

Having captured, collated, indexed and stored sets of transaction records, it may be that they remain in storage for a statutory time period after which time they are deleted. However, in the event that particular transaction records do need to be identified and retrieved, typically at very short notice, the following preferred search and retrieval sub-process is implemented in the present invention.

Referring to FIG. 2, a flow chart summarises the preferred search and retrieval sub-process beginning at STEP 50 with receipt of user-defined search criteria. At STEP 55 the search criteria are used initially to identify one or more groups of stored, compressed transaction records on the basis of the one or more key data types represented in the first level index. Indexation, and therefore identification of one or more groups of records, will typically be on the basis of transaction time periods and the identified group or groups of records will be those potentially containing transaction records relating to times within a defined period. However, first-level indexing and retrieval on the basis of any data type represented in a transaction record may be provided.

At STEP 60 the identified group or groups of records are retrieved and de-compressed to their imported or converted format. The de-compressed records are then indexed, at STEP 65, to create a second level index to a greater level of detail using any selection of the identified data types represented within the data field structure of the transaction records, preferably including and in addition to those one or more data types represented in the first level index. Preferably the same indexing technique is used to create the second level index as was used to create the first level index. The second level index is intended to allow identification of particular transaction records not only on the basis of more specific time intervals than would be required to identify stored groups of records, but also on the basis of other data stored in the transaction records, such as called telephone number or location identifier in the case of telecommunications call records. Therefore, at STEP 70, transaction records are identified and extracted on the basis of user-defined search criteria using the second level index.

By generating only a first level index prior to storage of groups of transaction records, sufficient only to identify particular groups of stored records, the process of records capture and storage is very quick and the data storage capacity required for the compressed groups of data and the first level index can be minimised. A particularly advantageous feature in the present invention relates to the collation of records into groups on the basis of predetermined grouping criteria. Preferably, the grouping criteria may require that at least a predetermined quantity of data is collated to form a group of records prior to compression to ensure that the performance of the data compression algorithm exceeds a predetermined level. This may entail the capture of data over a variable time period depending upon the rate of generation of transaction records by the source, so affecting the level of resolution into the data provided by the first level index. However, compression performance may be defined not only by the degree of compression achieved—so reducing the data storage requirements—but, when very large volumes of data need to be captured and stored, also in the speed of the overall compression and storage process. Typical compression levels may exceed a 90% reduction in stored data volume if the group composition is correctly chosen. Transaction data are often highly variable with little repetition within and across records. This limits the performance of known data compression algorithms should they be limited to compressing only relatively small numbers of records.

Particular steps within each of the two sub-processes described in outline above will now be described in more detail.

Referring again to FIG. 1, STEP 10—capture of transaction records—comprises receiving transaction records from a known source either by streaming of records over a network as they are created or at regular intervals in the form of batches of records downloaded over the network or by means of another form of data carrier. The capture process also ensures that any key external data, such as a source identifier or time period to which the records relate, if not recorded within the records themselves, are also captured and associated with respective captured transaction records at this stage.

STEP 15—import of captured transaction records—comprises initial processing of captured transaction records, for example to import those data records into a common format, as required, according to a data structure template associated with their source, or by other means of analysis. If required, a data quality check may also be carried out as part of the import step enabling records that are incomplete, or of no subsequent value due to other reasons such as data corruption, to be rejected at this stage rather than consume further processing and storage capacity.

STEP 20—collation of imported records—carries out a grouping of imported transaction records according to predetermined grouping criteria. The grouping criteria are designed not only to improve the performance of the data compression algorithm implemented at STEP 30, but also to optimise the steps of indexing and storage of the collated records, as will be discussed in more detail below, enabling one or more groups of records to be allocated to processing by one of multiple parallel processing threads, each thread being initiated according to demand. The grouping criteria may also take account of requirements for search and retrieval of stored compressed records, for example ensuring that a balance is struck between the size of collated groups of records and the potential speed of identification of relevant groups of records and of individual records within them.

The grouping criteria may define any one of a number of different parameters known to affect the performance of the data compression algorithm. Such parameters may include: data volume; measures of data diversity within and across transaction records; and value ranges for selected transaction record data fields. Collation may result in groupings of records that vary in their volume of data and in the time intervals or other data ranges they represent, in order to satisfy the grouping criteria. Collation may also take account of external data captured at STEP 10.

STEP 25—creation of a first level index—uses a known indexing technique to generate or to extend a first level index based upon one or more data fields in the transaction records or upon external data captured at STEP 10. The first level index is intended to record a link between values of an indexed data field and one or more groups of collated transaction records likely to include records containing or relating to such values. Preferably, the first level index represents data sufficient only to identify one or more groups of transaction records and does not attempt to reference individual records within a group. An identified group of records may not in fact contain any records having a particular defined value for one of the indexed fields, but would contain records within a range of values that includes the defined value. In this way, the first level index has the benefit of being simple and quick to create and of imposing a small data storage overhead.

Where, as referred to above in relation to STEP 20, the grouping criteria allocate one or groups of records to a distinct data processing thread, the first level index is created to index those groups of transaction records being processed within that thread, a different first level index being created for each newly instantiated processing thread. A further index may also be generated and maintained at the first level to link the indexed data field or fields to super-groups of records, a super-group of groups comprising those groups processed by a distinct processing thread.

In an alternative embodiment, a single first level index may be created to index all collated groups of records. In that instance, the collation of newly imported records into a new group triggers an extension to the first level index.

STEP 30—compression of imported transaction records—comprises the execution of a known data compression algorithm to compress each group of collated transaction records to form a separately retrievable compressed data file. Preferably a compression algorithm such as the well-known PZip is used, although alternative compression algorithms may be used as would be known to a person of ordinary skill in the field of data compression. The performance of compression algorithms such as PZip is influenced by, amongst other factors, the structure of the data to be compressed, the level of repetition in the data or other measures of data diversity. The predetermined grouping criteria, mentioned above, are intended to result in groups of transaction records for which the chosen compression algorithm is able to achieve a preferred level of compression performance. Given the nature of transaction records, often containing little repetition of data within and between records, a grouping criterion may define a minimum number of transaction records of a particular type to ensure a given level of confidence in data redundancy. Preferably, a compression level of 90% or more, that is, the generation of a compressed data file occupying 10% or less of the uncompressed data storage requirement, may be achieved with the PZip algorithm with a preferred set of grouping criteria.

Having achieved a preferred level of compression of the groups of imported transaction records, the resultant compressed data files are stored at STEP 35 in a retrievable form in a bulk data storage facility or on suitable data carriers. Where appropriate, the first level index may record information identifying the physical location of the stored data files, for example when the compressed data files are stored on removable media.

Preferably, as discussed above, where super-groups of records are processed in different data processing threads, the resultant compressed data files and the resultant first level index may be persistently stored in a distinct data storage area for each thread.

In the event that stored transaction records need to be retrieved, the present invention provides search and retrieval functionality to enable any transaction records relating to or containing data matching defined search criteria to be identified and retrieved.

A search and retrieval engine is provided, to be described in detail below, to implement the search and retrieval functionality outlined above with reference to FIG. 2, enabling a user to initiate a structured enquiry or a free-text search of stored data. The structured enquiry may comprise user-defined values or value ranges for particular data fields known to exist within the field structure of a transaction record. These data fields may include any data fields forming the basis of the first level index so that an initial selection can be made of one or more groups of records on which to carry out a second level search. Similarly, a free-text search may be initiated following a first level selection of groups of records to search, although in principle a free-text search of the entire data store can be carried out given a sufficiently long time period. The process outlined above with reference to FIG. 2 will now be described in more detail.

Referring again to FIG. 2, STEP 50—receipt of user-defined search criteria—refers to entry by a user of values or value ranges for one or more data fields known to be contained in store transaction records as the basis for identifying and extracting matching records. Preferably, the search criteria define at least a value or value range for a data field forming the basis of the first level index.

STEP 55—identification of groups of records to search—comprises taking a value or value range entered by a user for at least one data type represented in the first level index and using these entered data, through the first level index, to identify one or more groups of stored records that relate to the entered value or value range. The identified group or groups of records are then retrieved from storage, at STEP 60, and decompressed using a decompression algorithm corresponding to the compression algorithm used at STEP 25, referenced above. Having restored the retrieved group or groups of records to their imported format, the search and retrieval engine generates a second level index to all the retrieved records, at STEP 65, using a known indexing technique and based upon one or more data types known to be comprised in the field structure of the retrieved transaction records. The user-defined search criteria may define a value or a range of values for any combination of the data types represented in the second level index so that relevant records may be identified and presented.

The generation of a second level index to the retrieved group or groups of records enables, at STEP 70, a particularly rapid identification and extraction of transaction records matching a user's entered search criteria. There is also the advantage that processing time required at STEP 65 for the generation of the more complex second level index and the consequent data storage is only consumed in the event that records need to be searched and retrieved, rather than during the data capture and storage process represented in FIG. 1. The second level index is restricted to the group or groups of records retrieved using the first level index and is therefore much smaller and more rapidly created than an index to all, or a greater subset, of the stored records. Preferably, the second level index is created using the same indexing technique as used to create the first level index.

In an alternative approach, a single index to the second level may be created at STEP 25 and stored so that the generation of the second level index at STEP 65 is not required. If time constraints are more of a limitation at the data capture and storage stage—the sub-process of FIG. 1—than at the search and retrieval stage—the sub-process of FIG. 2—then the separate generation of two indexes at different levels of detail, at STEP 25 and STEP 65, may be preferred.

A preferred transaction data storage and retrieval apparatus for implementing the sub-processes described above with reference to FIG. 1 and FIG. 2 will now be described with reference to FIG. 3 and FIG. 4, respectively.

Referring initially to FIG. 3, and additionally to FIG. 1, an apparatus 100 comprises two principal sub-systems for implementing the process of FIG. 1 for the capture and storage of transaction records. The first, an Ingest Engine 105, is provided to capture transaction data downloaded from transaction recorders 110 over a network 115 (or by other means such as fixed media reading devices, not shown in FIG. 3) and to carry out initial processing of the captured data according to STEP 10 and STEP 15 of FIG. 1. The second, an Indexing and Storage Engine 120, is provided to carry out indexing and storage of the initially processed transaction data according to STEP 20, 25, 30 and 35 of FIG. 1, using preferred techniques to be described in further detail below that enable rapid and efficient storage of data and effective subsequent retrieval.

A third sub-system may also be provided—a Search and Retrieval Engine 125, mentioned above—arranged to implement the preferred search and retrieval functionality of FIG. 2 upon data stored by the apparatus 100. The search and retrieval engine 125 may be more or less integrated with the apparatus 100 according to the particular applications to which the present invention is to be applied. For example, the search and retrieval of data captured and stored by the apparatus 100 may be carried out by a separate software module, optionally integrated with third-party software, implementing the preferred search and retrieval functionality of the present invention in the context of a specific application. For other applications, it may be convenient to integrate the search and retrieval functionality with the other two sub-systems 105, 120 of the apparatus 100 so that all the data capture, storage, search and retrieval functionality may be integrated within a single product.

The ingest engine 105 is provided with a network interface 130 to enable data sources, e.g. transaction recorders 110, to be accessed over the network 115. Data downloaded from the transaction recorders 110 may exist in a number of different formats. A format converter 135 is provided with the aim either of restructuring the received data into a predetermined format having identifiable data fields, as defined in a reference store 140 of data structures or record templates expected from each source 110 of transaction records, or of determining the format of the received transaction data at least to the extent that the key data field or fields required to form a first level index can be identified. A data quality analysis module 145 is also provided to carry out pre-processing of received data to ensure that it conforms to predetermined levels of quality, in particular with respect to completeness, readability, accuracy, format, latency (is the data up-to-date?), etc. relative to other records from the same source or with reference to the expected structure and content of records from that source as defined in the data structures store 140 or elsewhere. This provides an opportunity to discard transaction records that will have no future use due to missing data or corruption, for example.

The ingest engine 105 outputs the initially processed data to the indexing and data storage engine 120. A record collation and sharding module 150 is provided to implement the grouping criteria mentioned above, according to STEP 20 of FIG. 1, so that subsequent data compression functionality, in particular, may perform to required levels. The module 150 is also arranged to implement a so-called "sharding" algorithm. The sharding algorithm is arranged to allocate one or more groups—a "super-group"—of collated records to a "shard" of data processing and storage comprising a separately executing thread of data processing and an actually or virtually distinct data storage area 155 in a bulk data storage facility 160. The storage area 155 for each shard comprises a store 165 for the compressed data and a store 170 for the first level index created in respect of the records processed in that shard. Multiple threads of data processing may be executed in the indexing and storage engine 120 to enable rapid parallel processing and storage of captured data. Thus, the steps of first level indexing (STEP 25), data compression (STEP 30) and data storage (STEP 35) may be implemented within a data processing thread dedicated to the indexing, compression and storage of the super-group of records allocated to a particular shard, one of a number of parallel software processing threads instantiated according to the grouping criteria in STEP 20. Each thread of processing terminates upon completion of the processing and storage for the super-group of records allocated to the respective shard.

The indexing functionality is represented in FIG. 3 by an indexing module 175, arranged to implement a known indexing technique to generate or to update a first level index in respect of the groups of records allocated to a particular shard. The particular data field or fields on which the first level index is to be based may be identified, if necessary, with reference to the data structures store 140, according to the source 110 of the records being processed. Typically, for transaction data, the first level index will be generated using date and time data fields, although other bases for the first level index may be devised, for example geographical location of a party to a transacted event if captured in or associated with the records. The indexing module 175 is also arranged to maintain a sharding index (180) comprising links to the super-groups of records being stored (165) with each shard. The sharding index (180) may be based upon the same data field or fields, or equivalent, as the first level index so that in response to a search and retrieval query, one or more super-groups of stored records (165) of potential relevance to the query may be identified and their respective stored first level indexes (170) accessed and retrieved. The sharding index may be stored persistently in a sharding index store 180 and updated with the creation of each new shard, or it may be maintained in volatile memory for more rapid access.

The indexing module 175 may be arranged to apply the same indexing technique to generate second level indexes (STEP 60 in the process of FIG. 2), on demand, relating to retrieved transaction records in support of the functionality of the search and retrieval engine 125, as will be described below. Such second level indexes may optionally be created at the same time as the first level indexes, and may be combined with the first level indexes to form a single index that will be stored (170) along with the compressed records (165).

The data compression functionality is represented in FIG. 3 by a data compression module 185, arranged to implement a predetermined data compression algorithm to compress the groups of transaction records allocated to a particular shard. The grouping criteria implemented by the record collation and sharding module 150 are designed to ensure that the compression performance of the data compression algorithm reaches a predetermined level. If more than one type of data compression algorithm is implemented by the data compression module 185, different grouping criteria may be implemented by the record collation module 150, the relevant grouping criteria being selected according to the data compression algorithm to be used to compress a particular group of records, or records from a particular source 110.

Compressed transaction records are persistently stored (165) in the bulk data storage facility 160 which may be located remotely from the apparatus 100, if required.

The search and retrieval engine 125, mentioned above—is arranged to implement the preferred search and retrieval functionality of FIG. 2 upon data stored by the apparatus 100 in the bulk data store 160. The search and retrieval engine 125 may be more or less integrated with the apparatus 100 according to the particular applications to which the present invention is to be applied. A preferred apparatus for implementing the functionality of FIG. 2 will now be described with reference to FIG. 4.

Referring to FIG. 4, the search and retrieval engine 125 is provided with a user interface module 200 arranged to communicate with a user's terminal equipment 205, for example over the network 115, to enable (STEP 50 in FIG. 2) a user to define search criteria for the identification and retrieval of stored records. A search and retrieval module 210 is provided to receive the user-defined search criteria and, initially, to implement STEP 55 in the process of FIG. 2. This involves, firstly, accessing the stored sharding index (180), created and updated by the indexing module 175, and using it to identify one or more relevant data storage areas 155 likely to include records (165) of relevance to the defined search criteria, at least on the basis of the data field or fields of the first level index. The stored first level index (170) for each identified data storage area 155 is then retrieved and used by the search and retrieval module 210 to identify one or more specific groups of stored compressed records (165) from the selected data storage areas 155 of potential relevance to the defined search criteria. The identified groups of compressed records are then retrieved from their respective stores 165 (STEP 60 in FIG. 2) and passed to a data decompression module 215 to be restored to uncompressed form, reversing the data compression applied earlier to those records by the data compression module 185.

The indexing module 175, or a separate indexing module dedicated to the search and retrieval engine 125, may then be applied to use the same underlying indexing technique as was used to generate the first level index to generate a second level index to the decompressed records (STEP 65 in FIG. 2) using a predetermined selection of the data fields known to exist in the applicable record data structure. If necessary, reference may be made to the data structures store 140 to determine the format of data fields available for the particular records retrieved, for example on the basis of their source 110.

Of course, a different indexing technique to that used for the first level index may be used to generate the second level index, so long as it achieves the same objective of enabling a search to be carried out on the decompressed records to the level required by the defined search criteria.

The search and retrieval module 210 is then arranged to use the second level index to carry out a record-level search of the decompressed records according to the defined search criteria to identify and retrieve relevant transaction records (STEP 70 in FIG. 2). Retrieved records may be presented to the user through the user interface 200.

In typical application, the present invention may be applied to the capture, storage and subsequent retrieval of telecommunications call records on behalf of fixed and mobile telecommunications service providers. Telecommunications call records for fixed line voice calls typically contain, for each call made, at least a start date and time of the call, an end date and time, a calling line number and a called line number. Call records for mobile phone calls typically contain these four items of information together with other data, for example data indicative of the geographical location of the calling mobile subscriber and of the respective called mobile subscriber. The ingest engine 105 receives the call records, typically in batches, from the respective service providers and, following any necessary format conversion (135) and data quality checking (145), including ordering of the records by start date and time if required, passes the records to the storage and indexing engine 120. There, the call records are collated so as to achieve required data compression levels and the sharding algorithm allocates particular groups of records to a dedicated shard of data processing and storage, the groups of records allocated to each shard being indexed to a first level on the basis of the start date and time field of calls. A sharding index 120 is also updated on the basis of the date and time interval represented by the super-group of call records allocated to each shard. After compression (185), each collated group of records is stored (165) in the allocated storage area 155 for the shard together with the first level index (170) to those groups of records.

In the event that particular call records need to be extracted, a user is able to define search criteria by means of the user interface 200. Typical enquiries supported by the search and retrieval engine 125 include the following:
(1) Provide records of all calls originating from a given calling subscriber number within a defined time interval on a particular date;
(2) Provide records of all calls to a given subscriber number within a defined time interval on a given date;
(3) Provide records of all calls to a given destination mobile number when within a given geographical area, within a defined time interval on a given date;
(4) Provide records of all calls placed by a particular mobile subscriber when within a given geographical area on a given date.
(5) Provide records of all calls to a given destination number lasting less than 10 seconds, initiated between given dates.

In general, enquiries relating to transactional data are likely to relate to at least one defined time period. Therefore, in response to a typical enquiry, the search and retrieval module 210 accesses the sharding index (180) to select one or more areas 155 of data storage likely to include groups of records relevant to each defined time period. The first level index stored (170) in each selected storage area 155 is then retrieved and used to identify the particular group or groups of records likely to contain call records within the defined time period. The identified group or groups of records are then decompressed (215) and a second level index is generated (175) to the decompressed records based upon at least the data fields necessary to satisfy the remainder of the enquiry. The second level index is then used to identify particular records from the decompressed records whose contents match the terms of the enquiry and to present them at the user interface 200.

In the event that a single index was generated (175) prior to data compression (185) and stored (170) based upon all the data fields likely to be involved in a subsequent query, then a second level index does not need to be separately generated at this stage and the enquiry may be satisfied and relevant records identified on the basis of the retrieved index for each selected storage area 155.

Transaction records identified by the search and retrieval engine 125 may be supplied to users over a number of different types of interface, including visual display devices showing output from the user interface module 200, or electronic data transfer over the network 115 or over other types of network, according to the urgency of the need and the way in which the data will be used.

A further preferred application of the present invention is the capture and storage of IP records of internet traffic, involving volumes of data and rates of data generation of potentially an order of magnitude greater than for telecommunications call records.

Variations in the assembly of functional modules of the present invention as would be apparent to a person of ordinary skill in the relevant art are intended to fall within the scope of the present invention as now claimed.

The invention claimed is:

1. A method for generating a searchable archive for transaction records, wherein each transaction record comprises values for each of a plurality of parameters at least one of which relates to time, the method comprising:
receiving, by an ingest engine comprising one or more processing units, a plurality of transaction records;
collating, by the ingest engine, the received transaction records into a plurality of groups of transaction records according to predetermined grouping criteria;
generating, by an indexing and data storage engine comprising a plurality of parallel processing units, one or more first level indexes to the plurality of groups of transaction records, wherein each of the one or more first level indexes is based upon at least one data type associated with the transaction records, wherein each group is indexed by a parallel processing thread executed by one or more of the parallel processing units, and wherein different groups are indexed by different parallel processing threads;
applying, by the indexing and data storage engine, a selected compression algorithm to compress each of the plurality of groups resulting from the collating, wherein each group is compressed by the same parallel processing thread used to index the respective group; and
storing, by the indexing and data storage engine, the compressed groups of transaction records, wherein each compressed group is stored by the same parallel processing thread used to index and compress the respective group;
wherein said predetermined grouping criteria are defined according to the selected compression algorithm and to the content of the received transaction records thereby to achieve a predetermined level of compression performance.

2. The method according to claim 1 wherein the predetermined grouping criteria define a minimum number of transaction records or a minimum volume of data to be contained within a group of transaction records being collated for compression.

3. The method according to claim 1 wherein the predetermined grouping criteria define a measure of diversity in the content of data to be achieved when collating a group of transaction records for compression.

4. The method according to claim 1 wherein the predetermined grouping criteria define a range of values for one or more data types relating to records in a group of transaction records being collated for compression.

5. The method according to claim 1 wherein the predetermined grouping criteria further comprise criteria for allocating one or more collated groups of transaction records to one of a plurality of shards of processing and storage and wherein each of the one or more first level indexes is generated by, and in respect of records allocated to, a different one of said plurality of shards.

6. The method according to claim 1 wherein the predetermined level of compression performance comprises at least a 50% reduction in data storage required for a compressed group of transaction records in comparison with that required for a respective uncompressed group.

7. The method according to claim 1 wherein the predetermined level of compression performance comprises at least a 70% reduction in data storage required for a compressed group of transaction records in comparison with that required for a respective uncompressed group.

8. The method according to claim 1 wherein the predetermined level of compression performance comprises at least a 90% reduction in data storage required for a compressed group of transaction records in comparison with that required for a respective uncompressed group.

9. The method according to claim 1 wherein the transaction records comprise telecommunications call records.

10. The method according to claim 1 wherein the transaction records comprise financial records.

11. A method for retrieving compressed transaction records stored according to the method of claim 1, further comprising:
  receiving search criteria for the retrieval of stored records, the search criteria defining a value or a value range for one or more data types represented in the stored records;
  using a first level index generated in respect of the stored records to select one or more compressed groups of records of relevance to the received search criteria;
  decompressing the selected one or more groups of records; and
  identifying one or more of the decompressed records whose content matches the received search criteria.

12. The method according to claim 11, wherein identifying one or more of the decompressed records comprises generating one or more second level indexes to the information contained within the decompressed transaction records and using the one or more second level indexes to identify and retrieve one or more individual transaction records matching the received search criteria.

13. The method according to claim 12, wherein the same indexing functionality is used to create indexes at both the first and the second levels.

14. The method according to claim 12, wherein identifying one or more of the decompressed records further comprises persistently storing the one or more second level indexes.

15. A computer program product having instructions encoded thereon that when executed by a computer cause the computer to implement a process for generating a searchable archive for transaction records, wherein each transaction record comprises values for each of a plurality of parameters at least one of which relates to time, the process comprising
  receiving, by an ingest engine comprising one or more processing units, a plurality of transaction records;
  collating, by the ingest engine, the received transaction records into a plurality of groups of transaction records according to predetermined grouping criteria;
  generating, by an indexing and data storage engine comprising a plurality of parallel processing units, one or more first level indexes to the plurality of groups of transaction records, wherein each of the one or more first level indexes is based upon at least one data type associated with the transaction records, wherein each group is indexed by a parallel processing thread executed by one or more of the parallel processing units, and wherein different groups are indexed by different parallel processing threads;
  applying, by the indexing and data storage engine, a selected compression algorithm to compress each of the plurality of groups resulting from the collating, wherein each group is compressed by the same parallel processing thread used to index the respective group; and
  storing, by the indexing and data storage engine, the compressed groups of transaction records, wherein each compressed group is stored by the same parallel processing thread used to index and compress the respective group;
  wherein said predetermined grouping criteria are defined according to the selected compression algorithm and to the content of the received transaction records thereby to achieve a predetermined level of compression performance.

16. The computer program product according to claim 15 wherein the predetermined grouping criteria define at least one of:
  a minimum number of transaction records or a minimum volume of data to be contained within a group of transaction records being collated for compression;
  a measure of diversity in the content of data to be achieved when collating a group of transaction records for compression; and
  a range of values for one or more data types relating to records in a group of transaction records being collated for compression.

17. The computer program product according to claim 15 wherein the predetermined grouping criteria further comprise criteria for allocating one or more collated groups of transaction records to one of a plurality of shards of processing and storage and wherein each of the one or more first level indexes is generated by, and in respect of records allocated to, a different one of said plurality of shards.

18. The computer program product according to claim 15, the process further comprising:
  receiving search criteria for the retrieval of stored records, the search criteria defining a value or a value range for one or more data types represented in the stored records;
  using a first level index generated in respect of the stored records to select one or more compressed groups of records of relevance to the received search criteria;
  decompressing the selected one or more groups of records; and
  identifying one or more of the decompressed records whose content matches the received search criteria.

19. The computer program product according to claim 18 wherein identifying one or more of the decompressed records comprises generating one or more second level indexes to the information contained within the decompressed transaction records and using the one or more second level indexes to identify and retrieve one or more individual transaction records matching the received search criteria.

20. The computer program product according to claim 19 wherein identifying one or more of the decompressed records further comprises persistently storing the one or more second level indexes.

\* \* \* \* \*